Patented July 20, 1926.

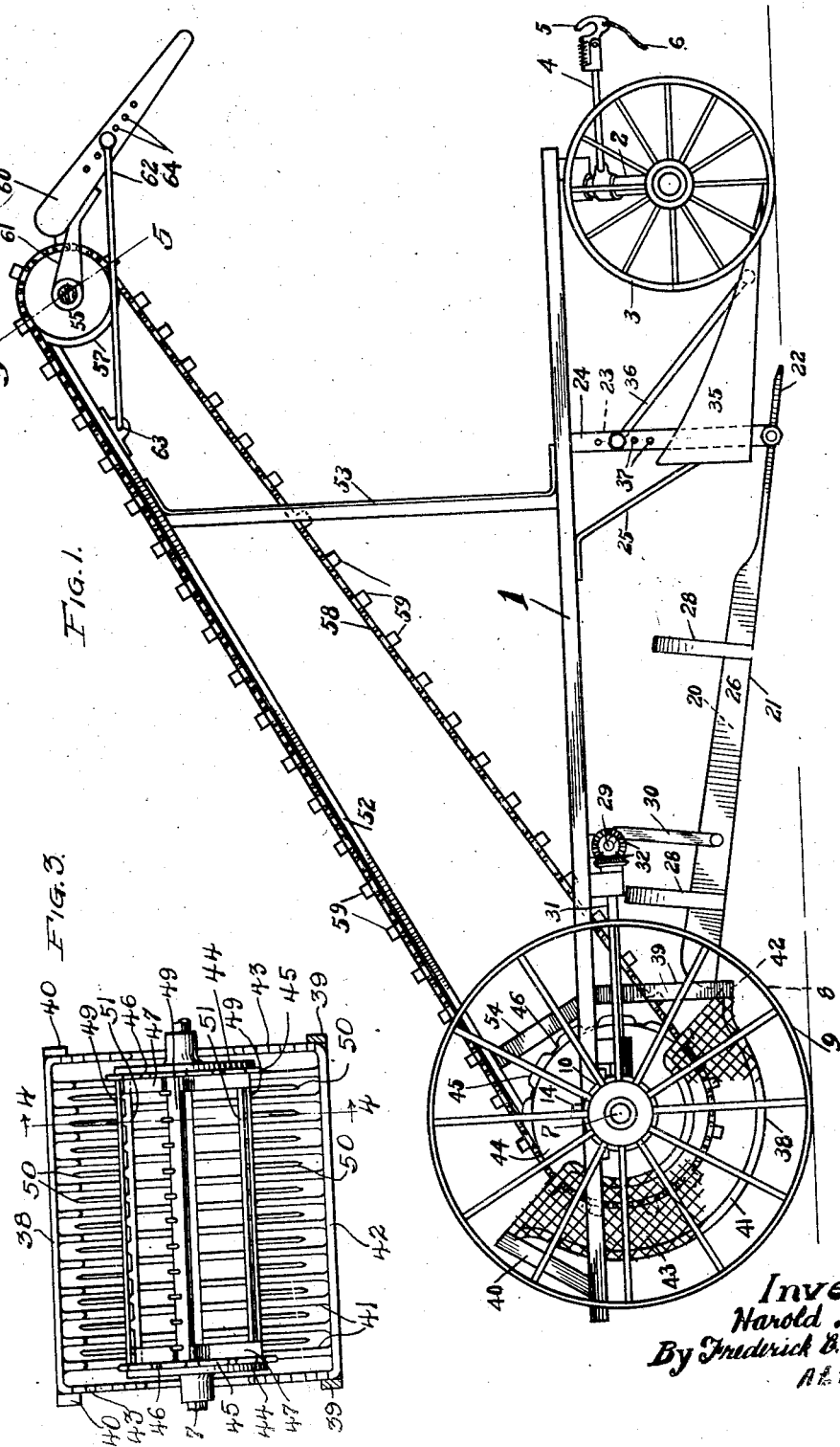

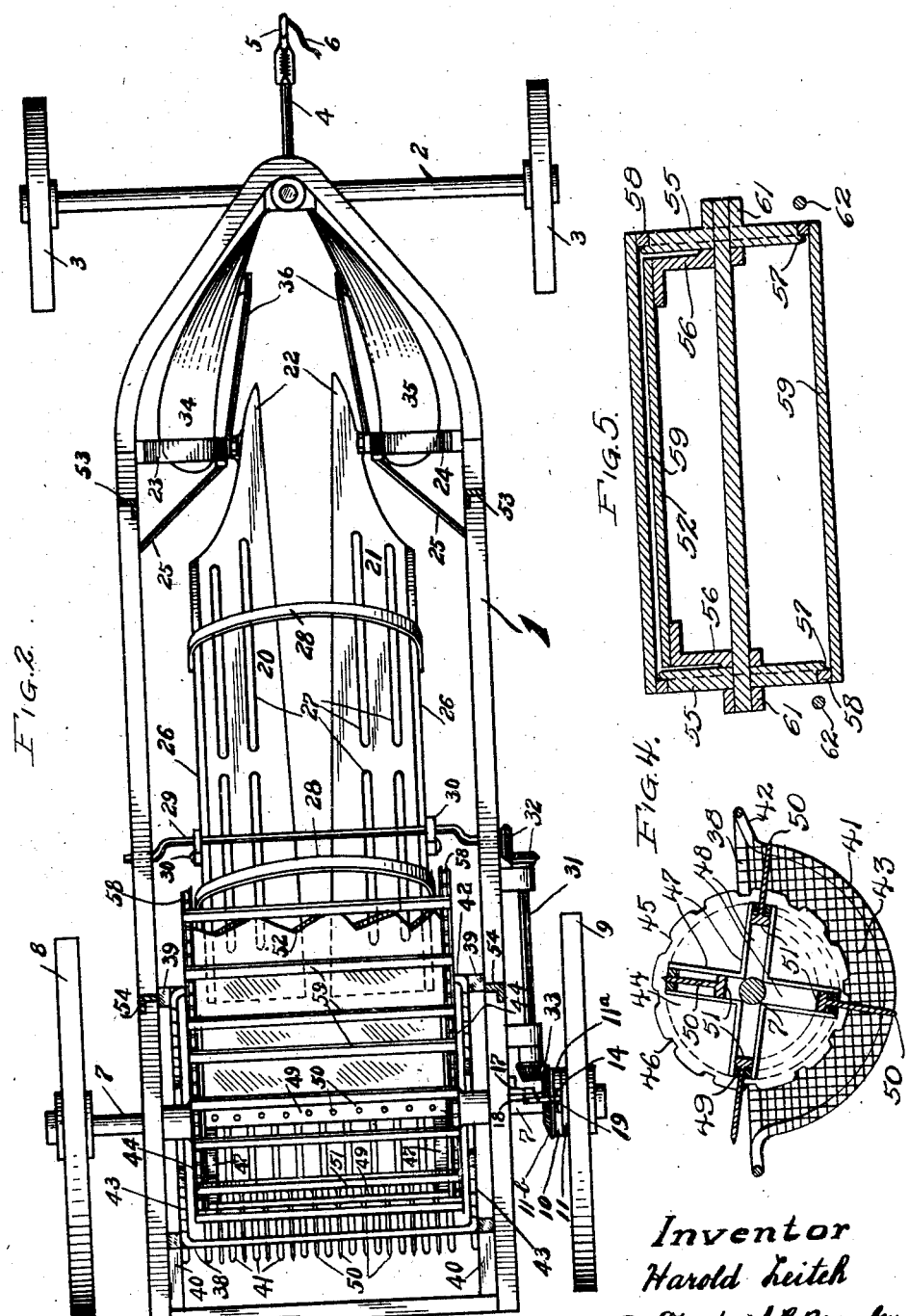

1,592,859

UNITED STATES PATENT OFFICE.

HAROLD LEITCH, OF HORNING'S MILLS, ONTARIO, CANADA.

COMBINED ROOT PULLER AND LOADER.

Application filed March 10, 1925. Serial No. 14,578.

The invention relates to improvements in combined root pullers and loaders as described in the present specification and shown in the accompanying drawings which form part of the same.

The invention has for its object to provide an implement for use in harvesting root crops specially adapted for turnips, mangel and sugar beet roots which have had their foliage previously severed in order that their roots may be extracted and loaded in a wagon by which the contrivance is drawn.

The invention consists substantially of a basket for receiving roots from a pick-up device, and an endless elevator for raising the roots and dropping them into a wagon, novel rack mechanism being disposed in the basket for feeding the roots onto the elevator.

Referring to the drawings: Figure 1 is a side elevation of the machine.

Figure 2 is a plan view thereof showing the major portion of the endless conveyor broken away.

Figure 3 is a detail of the basket and revolving racks.

Figure 4 is a transverse sectional view of Figure 3 taken on the line 4—4 thereof.

Figure 5 is a sectional view taken on the line 5—5 of Figure 1 illustrating the upper portion of the endless conveyor.

Like numerals of reference indicate corresponding parts in each figure throughout the drawings.

In the drawings, the reference numeral 1 indicates the frame of the running gear which may be of any suitable design. At the front of this frame is a swiveled axle 2 mounted upon wheels 3 and extending from this axle is a draft-bar 4 terminating in a coupling hook 5. This draft-bar and its hook are of the type commonly met with in agricultural machinery and hence no detail of the same is necessary. This hook connects with the rear end of the wagon to which the device is hitched and has the usual cord 6 for the purposes of its actuation.

At the rear of the frame is an axle 7 suitably journalled thereto and provided with wheels 8 and 9 which are rotatable independently of the axle.

10 depicts in a general way a clutch which engages the wheel 9 in locking engagement with its axle 7 in order to drive the mechanism of the apparatus.

The pick-up apparatus for the purpose of uprooting roots and delivering them to the basket may be of any suitable design or construction and that detailed in my copending application entitled "Pick-up apparatus for root loaders" Serial No. 77,275, filed Dec. 23rd, 1925, is given by way of example but not of limitation. Briefly this apparatus comprises a pair of forwardly inclined pick-up arms 20 and 21 which terminate at their forward ends in prongs 22 for pentrating the soil on each side of the roots to be uplifted. The inner marginal edges of the pick-up members 20 and 21 rearwardly converge in order to gradually raise the roots from the soil.

The prongs 22 are pivoted in the frame 1 and have a pair of ears 34 and 35 positioned in advance for brushing aside previously cut foliage of root crops, while the rear of the pick-up members are agitated by bars 30 suspended from a crankshaft 29 which is driven by a bevel-gear drive from the shaft 31. This latter shaft has a bevel-gear 33 which meshes with a similar gear 11$^b$ integral with or secured to the driven member of the aforesaid clutch 10.

Having outlined the pick-up apparatus, the present invention will now be recounted in detail.

38 designates the basket which is tilted at an acute angle at the rear end of the frame and is suspended at its forward end by members 39 rigidly secured to the frame and further carried at its rear end by members 40. This basket or receptacle is constructed of a plurality of semi-circular bars as at 41 outwardly offset at their ends. These bars are spaced a suitable distance from one another in order that roots contained within the basket may not slip therethrough.

The forward ends of these bars are united by a common cross-member 42 which forms a lip that is positioned slightly beneath the rear edge of the pick-up members 20 and 21 and constitutes the receiving end or mouth of the basket. The outwardly turned ends of the bar provide sufficient clearance for the racks hereinafter described to pass freely therebetween.

This basket is furthermore preferably provided with reticular sides as at 43 in order to permit soil shaken from the roots to pass therethrough, although imperforate sides may be provided if so desired.

Rigidly keyed to the shaft at each side of the basket is a sheave wheel 44 having an interrupted peripheral flange 45 formed by recesses as at 46. Constructed integrally with the inner face of each of these sheave wheels are flanges 47 extending radially and arranged in pairs, each pair forming a channel shaped passageway constituting a guide as at 48. Connecting the opposing extremities of these guides are perforated crossbars 49 rigidly secured to the sheave wheels in any manner found convenient and disposed in each pair of opposing guides is a slidable rack 50 comprising a stock 51 having teeth extending outwardly therefrom and passing through the apertures in its crossbar 49. These teeth are of sufficient length that when the rack is in its outermost position they project into the space between the bars 41 of the basket 38. By this construction, as the sheave wheels are revolved, as each rack arrives at a point below the centre of rotation it automatically moves outwardly by its own weight, and as it is rotated around the shaft and approaches a vertical position, it automatically recedes back to its former position.

52 is an imperforated incline extending forwardly and upwardly, positioned at a tangent to the sheave wheels; said incline being supported at its forward end by uprights 53 and at its rear end by supports 54. The forward end of this incline carries a pair of relatively small sheave wheels 55 tangentially positioned and journalled in brackets 56. These sheave wheels are provided with one or more peripheral flanges as at 57 and are situated in alignment with their corresponding sheave wheels.

The set of sheave wheels at each side of the frame carry an endless chain as at 58 which is retained thereon by the flanges borne by the sheave wheels.

Transversely positioned at regular intervals throughout the entire length of the chains are slats 59 arranged to engage in the recesses 46 of the sheave wheels 44 as they pass therearound in order to provide a positive driving connection for the conveyor chains. This form of driving connection is quite customary in hay loaders and the like and should be well understood from the description given.

60 is a chute carried at the upper end of the conveyor by means of brackets 61 journalled on the sheave wheel axle at that end. This chute is adjustable through rods 62 pivoted as at 63 to the incline and bolted to said chute in one of a series of openings 64 at each of its sides.

In the operation of this machine, as it advances through its connection with the draft vehicle over a row of the crop to be garnered, the ears 34 and 35 brush aside the foliage which has been previously cut therefrom, while the prongs 22 penetrate the soil and uproot the roots which are gradually raised from the ground by the converging edges of the pick-up members 20 and 21 until they rest thereupon. Upon engagement of the clutch 10 power is transmitted to the shaft 7 and bevel gear 11$^b$ and thence to the shaft 31 and crankshaft 29 by the bevel gearing. As the crankshaft reciprocates the bars 30, the pick-up members are agitated and the roots jigged therealong into the basket 38. The sheave wheels revolve by means of their connection with the axle 7, and their racks 50 gravitate outwardly, thus encountering the roots and conveying them rearwardly and upwardly onto the incline 52 of the endless conveyor, the racks automatically receding by gravity action on approaching a vertical position as previously recounted. The roots as they are deposited upon the incline 52 are conveyed upwardly therealong by the slats 59 of the endless chains 58 until they reach the top of the conveyor whence they are precipitated onto the chute 60 and thence into the wagon or receptacle drawing the machine.

What I claim is:—

1. In a device of the class described, a basket for receiving roots to be elevated, an endless conveyor having its receiving end disposed in said basket, rotatable racks carried at the receiving end of said conveyor for feeding roots from the basket onto said receiving end, said racks being constructed and arranged to recede upon arriving at the loading side of the conveyor, and means for actuating said racks.

2. In a device of the class described, a basket for receiving roots to be elevated, a pair of journalled sheave wheels protruding into said basket, an incline extending forwardly and upwardly therefrom, a further pair of sheave wheels journalled at the upper end of said incline in alignment with those aforesaid, conveyor chains connecting the aligned sheave wheels, guides borne by the inner faces of the first mentioned sheave wheels, racks slidably mounted in said guides and having teeth arranged to protrude in said basket, and means for operating said sheave wheels.

3. In a device of the class described, a basket for receiving roots to be elevated, an axle positioned across the opening of said basket, a pair of spaced sheave wheels journalled on said axle, and protruding into said basket, an incline extending forwardly and upwardly therefrom, further sheave wheels journalled at the upper end of said incline, one in alignment with each of the aforesaid sheave wheels, conveyor chains connecting each pair of aligned sheave wheels, transverse slats positioned at intervals around said conveyor chains, radially extending guides oppositely positioned on the inner faces of the first mentioned sheave wheels, apertured members extending between each pair of opposing guides, racks, one of which is positioned in each pair of the opposing guides with its teeth projecting through the respective apertured member, and means for rotating the shaft aforesaid.

Signed at Horning's Mills, Canada, this 28th day of January, 1925.

HAROLD LEITCH.